UNITED STATES PATENT OFFICE.

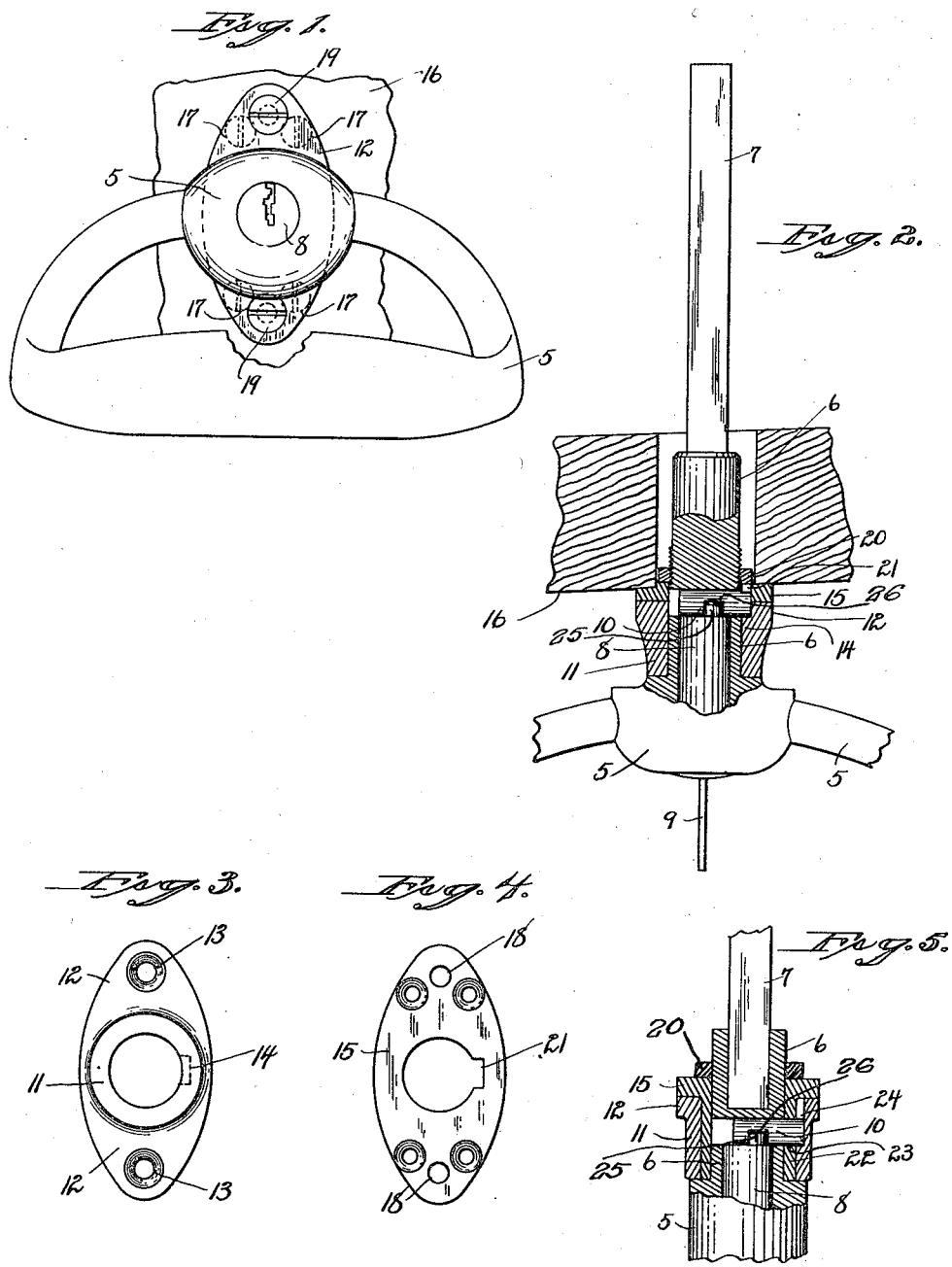

LOUIS W. GATES, OF NEW HAVEN, CONNECTICUT, ASSIGNOR TO C. COWLES & CO., OF NEW HAVEN, CONNECTICUT, A CORPORATION.

LOCK FOR VEHICLE DOORS.

1,418,786.  Specification of Letters Patent.  Patented June 6, 1922.

Application filed September 28, 1921. Serial No. 503,905.

*To all whom it may concern:*

Be it known that I, LOUIS W. GATES, a citizen of the United States, residing at New Haven, in the county of New Haven and State of Connecticut, have invented a new and useful Improvement in Locks for Vehicle Doors; and I do hereby declare the following, when taken in connection with the accompanying drawings and the characters of reference marked thereon, to be a full, clear, and exact description of the same, and which said drawings constitute part of this application, and represent, in—

Fig. 1, a front view of a lock for vehicle doors constructed in accordance with my invention.

Fig. 2, a top view, partly in section, showing the handle in its locked position.

Fig. 3, a detached view of the hub with its flange.

Fig. 4, a face view of the escutcheon-plate detached.

Fig. 5, a sectional view illustrating a modified form of my invention.

This invention relates to improvement in locks for vehicle doors, and particularly to locks which are mounted in the door-handle, and is another form of the invention shown and described in United States Patent No. 1,351,568, dated August 31, 1920. In the device shown in this patent, means were provided to prevent the door from being maliciously opened, and included means for covering the screws by which the device was secured in place, and also included a flange carried by the handle which covered the screws when the handle was in its locked position.

The object of this invention is also to cover the screws by which the handle is secured to the door, and so arrange the covering flange that it may also be secured by screws, and the invention consists in the construction as hereinafter described and particularly recited in the claims.

In carrying out my invention, I employ a handle 5 of any approved design, formed with a shank 6 mounted on the end of the usual spindle 7. The shank 6 contains the usual pin-tumbler cylinder 8 operated by a key 9 and includes the usual eccentric rearwardly-extending stud 25, which enters a notch 26 in a transversely-arranged locking-pin 10. Mounted upon the shank 6 is a hub 11 formed with a flange 12 provided with screw-holes 13 and with a locking-notch 14 in line with and adapted to receive about one-half of the locking-pin 10. This flange bears upon an escutcheon-plate 15 adapted to be secured to the front 16 of a vehicle door by screws 17. This escutcheon-plate corresponds substantially in form to the flange 12 and is provided with clearance-holes 18 for the screws 19, by which the hub-flange 12 is also secured to the vehicle door. This escutcheon-plate is mounted on the shank 6 and held against the hub by a nut 20 threaded onto the shank 6, and is formed with a locking-notch 21 registering with the notch 14 in the hub-flange and adapted, when the notches are in line, to be entered by the locking-pin 10. When the locking-pin 10 is retired or in its unlocked position, the spindle 7 is free to be turned, and the hub-flange may be turned with relation to the escutcheon-plate, so the escutcheon-plate may be secured in position by the screws 17. The hub-flange is then turned into place so as to cover the heads of the screws 17 and be secured in position by the screws 19. When the door is closed, the spindle is locked by throwing the locking-pin up, so as to enter the notches 14 and 21, and thus prevent the spindle from being turned. Should the screws 19 be removed, the handle cannot be removed because the hub-flange is locked in position and cannot be turned so as to expose the screws 17.

It is obvious, as shown in Fig. 5 of the drawings, that the escutcheon-plate 15 might be formed with a sleeve 22 projecting outwardly between the shank 6 and the hub 11, and the sleeve formed with a clearance-hole 23 for the locking-pin 10, which, when projected, will pass through the hole 23 into a notch 24 in the hub.

I thus accomplish the same results as accomplished in the patent before referred to, and, at the same time, provide a hub-flange which will not be turned with the handle.

I claim:

1. A lock for vehicle doors, comprising a handle, including a shank, a transversely-arranged key-operated locking-pin mounted in said shank, a hub around said shank in which the shank may turn and formed with a flange, an escutcheon-plate having screw-holes by which it may be secured to the outer face of a door, means for securing the flange of the hub over the escutcheon-plate, the said hub and escutcheon adapted to be interlocked by the said locking-pin.

2. A lock for vehicle doors, comprising a handle, including a shank, a transversely-arranged key-operated locking-pin mounted in said shank, a hub on said shank and formed with a flange, an escutcheon-plate having screw-holes by which it may be secured to the outer face of a door, the said hub-flange and escutcheon-plate each formed with a locking-notch adapted to be entered by the locking-pin.

3. A lock for vehicle doors, comprising a handle, including a shank, a transversely-arranged key-operated locking-pin mounted in said shank, a hub mounted on said shank, and formed with a flange provided at its ends with screw-holes, an escutcheon-plate having a plurality of screw-holes through which it may be secured to the outer face of a door, and with clearance-holes in line with the screw-holes in the hub-flange, means for mounting said hub and escutcheon-plate on the shank, said hub-flange and escutcheon-plate each formed with a locking-notch adapted to be entered by the said locking-pin, and whereby, when in the locked position, the screws by which the escutcheon-plate is secured in place are covered.

In testimony whereof, I have signed this specification in the presence of two subscribing witnesses.

LOUIS W. GATES.

Witnesses:
 FRANCIS A. FORD,
 JENNIE L. BROCKETT